(No Model.)
J. LINES.
OILER.
No. 605,321. Patented June 7, 1898.
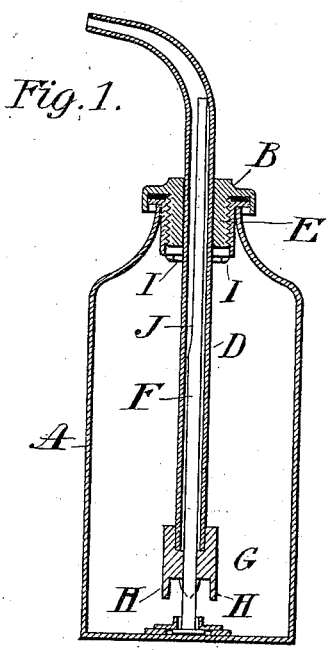
Fig. 1.
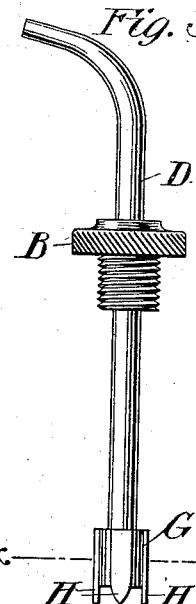
Fig. 3.
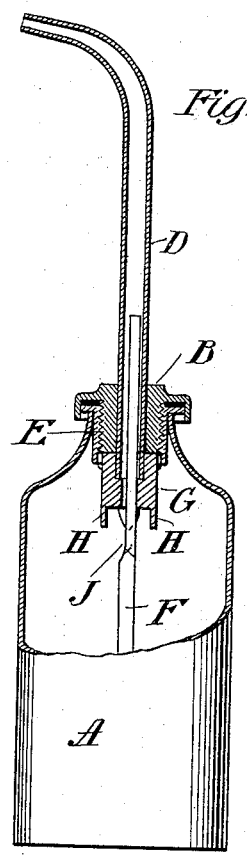
Fig. 2.
Fig. 5.
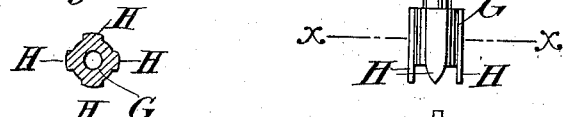
Fig. 4.
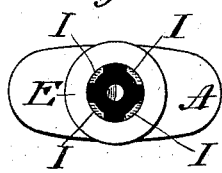
Fig. 6.
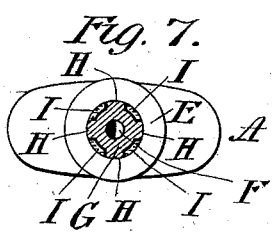
Fig. 7.
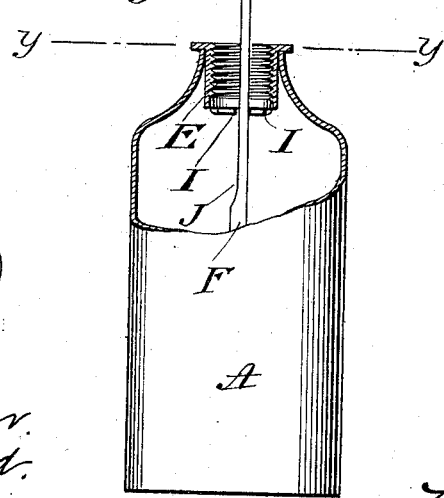
WITNESSES:
Frank S. Ober.
J. S. Osvald.
INVENTOR:
John Lines.
BY
R. Cunichee,
ATTORNEY
THE NORRIS PETERS CO., PHOTO-LITHO., WASHINGTON, D. C.

UNITED STATES PATENT OFFICE.

JOHN LINES, OF WATERBURY, CONNECTICUT, ASSIGNOR TO THE SCOVILL MANUFACTURING COMPANY, OF SAME PLACE.

OILER.

SPECIFICATION forming part of Letters Patent No. 605,321, dated June 7, 1898.

Application filed July 24, 1897. Serial No. 645,755. (No model.)

*To all whom it may concern:*

Be it known that I, JOHN LINES, a citizen of the United States, residing at Waterbury, New Haven county, Connecticut, have invented certain new and useful Improvements in Oilers, of which the following is a full, clear, and exact description.

My invention relates to an improved oiler for bicycles, sewing-machines, and the like; and it consists in the novel construction and arrangement of the parts thereof hereinafter fully described.

Among the main objects of my invention are the following: the provision of a suitable means in an oil-can having an extensible spout, whereby said spout is locked against rotation when pulled outwardly into its operative position, which means is of particular service when the outer end of the spout is curved or bent, as is ordinarily the case; further, the provision of a combined closer and cleaner for the oil-spout, which device acts as a stop limiting the inward excursion of the spout and also preventing looseness and rattling of the parts; further, the provision of a means whereby the inside of the spout is kept clean to allow the free passage of the oil.

Referring to the accompanying drawings, Figure 1 is a vertical sectional view illustrating the several features of improvement, the spout being at the limit of its inward excursion. Fig. 2 is a similar view, the parts being in their operative position, the spout being at the limit of its outward excursion. Fig. 3 is a side elevation of the detached portions. Fig. 4 is a similar view of another detached portion, the same being partly in section. Fig. 5 is a horizontal section on the line $x\,x$. Fig. 6 is a plan view of the liquid-receptacle, the spout being removed. Fig. 7 is a section on the plane of the line $y\,y$.

A is a suitable liquid can or receptacle.

B is a detachable closer therein.

D is a spout passing through and guided by a suitable stuffing-box E in said closer and free to move longitudinally therein.

F is a pin suitably supported, preferably in the bottom of the can A, and projecting upward, preferably to a slight distance above the closer B therein and for the purpose hereinafter described.

G is a stuffing-box at or near the lower end of the spout D.

H H are shoulders on the sides of the stuffing-box G or on the sides of the spout D, as preferred, said shoulders being adapted to enter the space between projections I I on the under side of the closer B. The number, length, thickness, and shape of the shoulders H H or the projections I I are immaterial so long as they coöperate to accomplish the end hereinafter referred to.

J is a longitudinal groove or recess in the side of the pin D toward its upper end, any desired number of which may be provided. These grooves J may also, if desired, be arranged spirally. The ends of the shoulders H H are by preference somewhat rounded or pointed for the purpose hereinafter described.

In the form of oil-can illustrated the end of the spout is bent at its upper or nozzle end to facilitate oiling inaccessible parts—such as, for instance, the oil-cup between the spokes of a bicycle-wheel. When thus used, it is manifest that unless suitable means is provided the operator will have difficulty in pressing the end of the nozzle into the said cup, for the reason that the spout will roll over and present its side instead of its point. To avoid this and to admit of the effective use of the oiler, the shoulders H H are provided. These shoulders when the spout is pulled outwardly pass between the projections I I, so that as long as the spout is extended it is securely locked against rotation. I have stated that the projections I I are carried by the closer B, but it is clear that these projections may be carried by any other stationary portion of the apparatus without departing from the spirit and scope of my invention. The stuffing-box G, carried by the tube or spout D toward its inner end, forms an oil-tight joint around the pin F when the spout is pushed inwardly. To permit the oil to be ejected from the receptacle, I have provided the groove or grooves J, above referred to, the inner ends of which are uncovered when the spout is extended. (See Fig. 2.) When it is desired to pack the oiler away, the extensible spout is pushed inwardly until the bend in the spout reaches the upper end of the pin F, at which point further inward movement of the spout is prevented, the said pin acting as a stop. The harder the spout is pushed in the more tight the frictional engagement between the pin and the inner surface of the spout becomes, and thus the parts are held against rattling. The length of the pin is such that it performs, in addition to a valve and check, the function of a cleaner, the said pin extending the entire length of the straight portion of the tubular spout when the latter is pushed in, keeping the said portion free from grit and the like.

I desire to have it understood that I contemplate that some further changes may be made as to the arrangement and construction of the several parts of this device without departing from the spirit and scope of my invention.

What I claim is—

1. An oiler, comprising a liquid-receptacle, a detachable closer therefor, a longitudinally-shifting spout guided by said closer, a pin within said liquid-receptacle projecting into said spout, and extending to a point above the limit of outer movement of the lower end of the spout, and a recess in the side of said pin toward its upper end, the spout and pin forming an oil-tight joint when the spout is pushed inwardly beyond said recess said pin assisting in holding the spout in the latter's outermost position.

2. An oiler, comprising a liquid-receptacle, an extensible spout therefor guided in a detachable closure at one end of said liquid-receptacle, a stuffing-box at the inner end of said spout, a stationary pin within said liquid-receptacle projecting through said stuffing-box and into the spout, the length of said pin being sufficient to project beyond the limit of outer movement of said stuffing-box, and a recess in the side of said pin whereby the liquid may be ejected from said receptacle through said spout when the latter is moved to its outer limit.

3. In an oiler having a longitudinal extensible spout, a curved nozzle end, a stop to limit the inward movement of said spout, comprising a pin held within said receptacle, projecting up into said spout and engaging the bent end of the spout when the same is moved to its inward position.

4. In combination, an oil-receptacle, an extensible nozzle, a pin in said receptacle having a reduced upper end and entering said nozzle when in its extended position, said reduced upper end engaging and holding said nozzle in said nozzle's extended position but allowing oil to then pass by said reduced portion.

5. In an oiler, in combination, a receptacle for oil, an extensible nozzle, a pin in said receptacle having part of its periphery at its upper end cut away, and extending into said nozzle at all times, said nozzle closely fitting the periphery of said pin at all times and aiding in retaining said nozzle in its extended position, but allowing oil to pass at the point where said periphery is cut away.

6. In an oiler, in combination, an oil-receptacle, an extensible hollow nozzle, a pin in said receptacle extending into said nozzle and closely fitted as to its periphery by said nozzle, said nozzle, in its extended position, fitting said pin and partially held in this position thereby but uncovering a passage in said pin for oil to flow from said receptacle.

Signed at Waterbury, in the county of New Haven and State of Connecticut, this 19th day of July, 1897.

JOHN LINES.

Witnesses:
T. R. HYDE, Jr.,
HENRY YEHE.